(12) United States Patent
Knotten

(10) Patent No.: US 7,987,874 B2
(45) Date of Patent: Aug. 2, 2011

(54) HOSE SYSTEM FOR HIGH PRESSURE HYDRAULIC SYSTEM

(76) Inventor: Inge Knotten, Gursken (NO)

( * ) Notice: Subject to any disclaimer, the term of this patent is extended or adjusted under 35 U.S.C. 154(b) by 927 days.

(21) Appl. No.: 11/909,639

(22) PCT Filed: Apr. 25, 2006

(86) PCT No.: PCT/NO2006/000151
§ 371 (c)(1),
(2), (4) Date: Oct. 10, 2007

(87) PCT Pub. No.: WO2007/011228
PCT Pub. Date: Jan. 25, 2007

(65) Prior Publication Data
US 2010/0175772 A1   Jul. 15, 2010

(30) Foreign Application Priority Data
Apr. 26, 2005   (NO) .................................. 20052020

(51) Int. Cl.
*F16L 9/00* (2006.01)
(52) U.S. Cl. ......... 138/109; 138/114; 138/104; 137/312
(58) Field of Classification Search .................. 138/114, 138/109, 104; 137/312
See application file for complete search history.

(56) References Cited

U.S. PATENT DOCUMENTS

| | | | |
|---|---|---|---|
| 3,299,417 A * | 1/1967 | Sibthorpe | 340/605 |
| 4,341,235 A | 7/1982 | Nord | 137/312 |
| 4,446,892 A * | 5/1984 | Maxwell | 138/104 |
| 5,267,670 A * | 12/1993 | Foster | 222/1 |
| 5,654,499 A * | 8/1997 | Manuli | 73/40.5 R |
| 5,713,387 A | 2/1998 | Armenia et al. | 137/312 |
| 5,714,681 A * | 2/1998 | Furness et al. | 73/40.5 R |
| 5,884,657 A | 3/1999 | Srock | 137/312 |
| 6,032,699 A * | 3/2000 | Cochran et al. | 138/104 |
| 6,129,107 A * | 10/2000 | Jackson | 137/312 |
| 6,374,863 B1 * | 4/2002 | Friederich | 138/104 |
| 6,498,991 B1 * | 12/2002 | Phelan et al. | 702/34 |
| 6,550,499 B1 * | 4/2003 | Pai | 138/104 |
| 2004/0177891 A1 * | 9/2004 | Spaolonzi et al. | 138/104 |

FOREIGN PATENT DOCUMENTS

| | | |
|---|---|---|
| DE | 2634963 | 6/2004 |
| DE | 10304952 | 6/2004 |
| EP | 0874185 | 10/1998 |

* cited by examiner

*Primary Examiner* — Patrick F Brinson
(74) *Attorney, Agent, or Firm* — Dennison, Schultz & MacDonald

(57) ABSTRACT

Hose system for use in an hydraulic system, includes a working hose for the transfer of hydraulic fluid having a pressure substantially higher than atmospheric pressure, and a safety hose surrounding the working hose, the working hose and the safety hose being tightly joined. A pressure transmitter is arranged for indicating a rise in pressure in a space between the two hoses. The system includes at least one bushing for releasable connection to the working hose and the safety hose. The cross-section of the safety hose allows space for the passing of the end couplings of the working hose. The bushing includes a space communicating with the space between the working hose and the safety hose, the space being in communication with a pressure transmitter able to signal an increase in pressure in the space between the working hose and the safety hose.

4 Claims, 1 Drawing Sheet

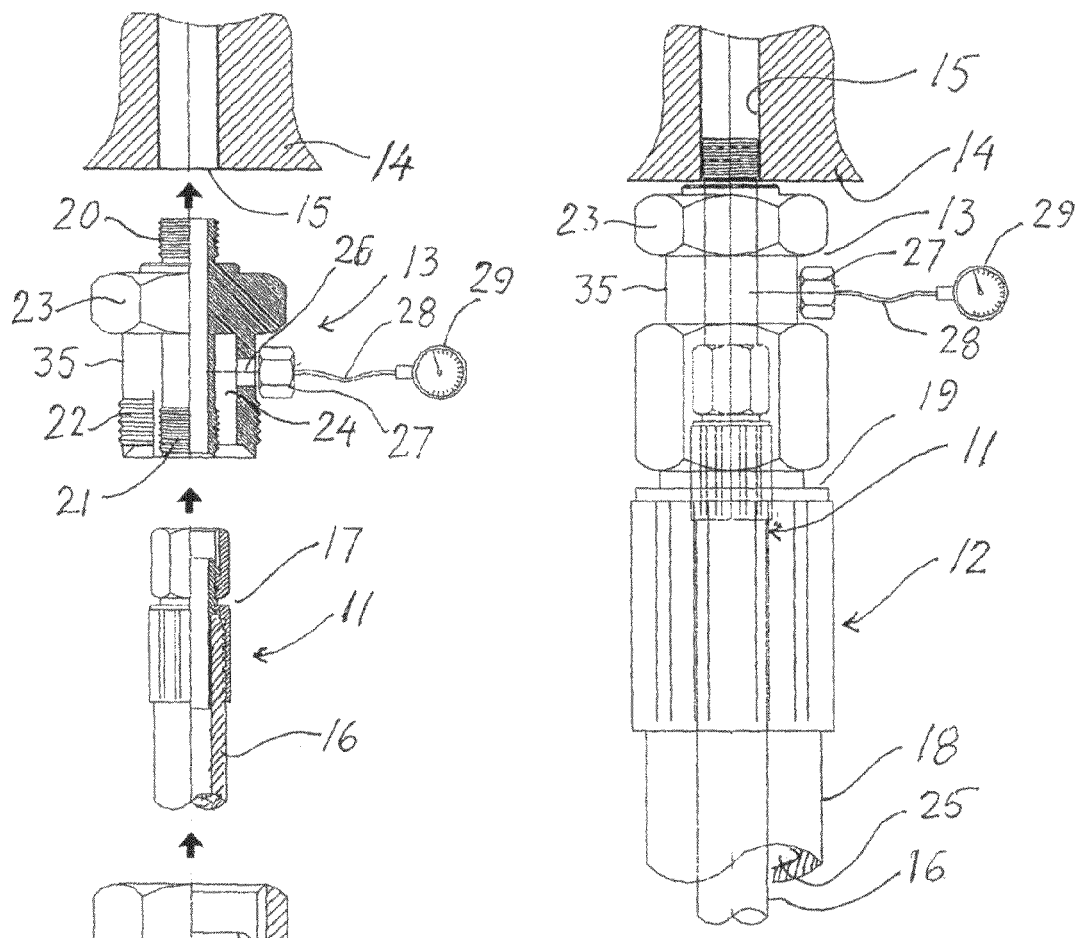
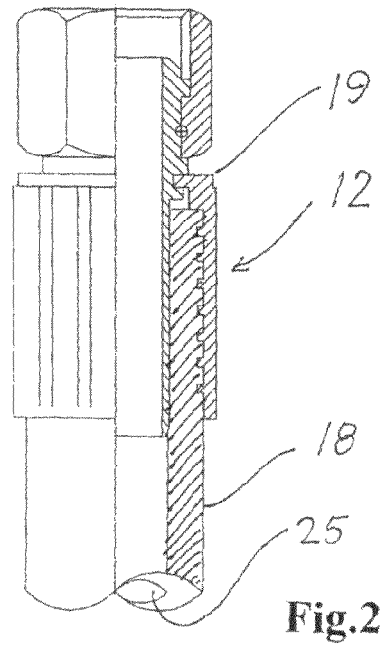
Fig.2
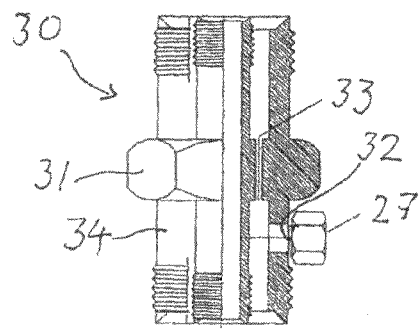
Fig.3
Fig.1

HOSE SYSTEM FOR HIGH PRESSURE HYDRAULIC SYSTEM

BACKGROUND OF THE INVENTION

The invention relates to a hose system that will eliminate the risk of an uncontrolled leakage in the event of hose failure.

BACKGROUND

Hydraulic hoses are in many different connections used for the transport and pressurizing of hydraulic fluids, both in connection with machines, transport equipment and different kinds of operating devices. With the increase in pressure level, and the use of hydraulic systems in areas vulnerable to pollutions from hydraulic fluids, the problems and risks in connections with such systems are increasing. An application in which such systems are currently are widely used is the marine environment, where the spillage of hydraulic fluids may have severe consequences.

The installation of pressure sensors in hose systems, to allow for the detection of a pressure drop caused by hose failure and subsequent generation of a shut-off signal for valves and pumps, is known in the art. However, these efforts have not been able to prevent that hose failure resulting in the loss of hydraulic fluid and consequently inevitable pollution. In addition, such systems are expensive to the extent that they will not be usable for all purposes, e.g. in smaller construction engines and boats.

U.S. Pat. No. 4,004,607 (Freese, 1977) discloses, for example, the arrangement of a shut-off valve at the inlet of a pressure conduit adapted for high pressure. The shut-off valve is actuated through a control conduit connected to the system to be protected. The implementation of this solution is complicated, involving unfortunate elements of uncertainty.

Several suggestions are known for the making of double hoses, to increase safety against leakage from hose failure.

International patent application WO 03044413 (Qutub Abe, 2003) discloses the arrangement of an double, outer hose over a pressure hose to increase the durability of the hose arrangement. However, this will not suffice in preventing failure of the improved hose leading to leakage.

US patent application 2002017330 (Armenia et al., 2002) discloses a double-walled hose having an outlet in the outer hose for fluid from leakage of the inner hose. This solution provides for the possibility of collecting the fluid caused by the leakage. However, to be able to meet the demands of such a possibility the accommodations will be elaborate and it will thus not be realizable in several areas of possible use.

U.S. Pat. No. 6,085,796 (Riga 2000) discloses a double-walled hose where the outer hose is able to collect leakages from the inner hose. This will increase the durability of the hose, but will not eliminate the risk of an unexpected leakage in the event of failure of the outer hose. Furthermore, this hose is designed as an integrated unit and will have to be replaced in its entirety in the event of a leakage in the inner hose.

U.S. Pat. No. 6,032,699 (Cochran et al. 2000) discloses a double-walled hose, the annulus between the hoses being filled with some inert gas having a higher pressure than the working pressure of the inner hose. With the creation of holes in the inner hose gas will thus leak into the hose from the outer hose. This will be an inappropriate solution for hoses having a high working pressure.

U.S. Pat. No. 6,550,499 (Pai 2003) discloses a double-walled hose having a leakage detector arranged within the annulus between the inner and outer hoses. In this case the hoses are tightly coupled together at the ends, which will require a special hose design. Furthermore, in the event of failure of such a double hose, replacing the entire hose system will be necessary.

None of the known hose systems have, used separately or in combinations, turned out to be fully satisfactory, neither for high-risk, high-pressure systems offshore nor for less demanding purposes on vessels, in construction engines and the like.

SUMMARY OF THE INVENTION

The main object of the invention is to improve existing double-walled hose systems, so that they may be used for the prevention of leakages under difficult conditions of operation, under high pressure and low accessability, for example in connection with subsea oil installations employing high-pressure hydraulic systems. It is also an object to create a hose system that will be more adequate, both in regard to manufacture and for use under different and less demanding applications, than known systems.

It is desirable that the hose system is, to as large an extent as possible is based on existing standard components. Furthermore, it will be desirable to be able to adopt the detection to different purposes. It will also be desirable to be able to make repairs in a simple and inexpensive manner.

Further, it is desirable to create an hydraulic system in which it will be possible to detect the types of failure most commonly encountered before they can cause any damages, so that it will be possible to perform maintenance and repairs to prevent a leakage from developing.

The invention is directed to a hose system for use in a hydraulic operation and/or control system, particularly for use in high-pressure hydraulic systems present in environments that are highly sensitive with respect to spillage of hydraulic fluids in the event of a leak, comprising a working hose for the transfer of hydraulic fluid having a pressure substantially higher than atmospheric pressure, and a safety hose surrounding the working hose, the working hose and the safety hose being tightly joined at least at the ends of the two hoses, and including a pressure transmitter for indicating a rise in pressure in the space (25) between the two hoses, and further comprising at least one bushing adapted for releasable connection to the working hose and the safety hose (12), the cross-section of the safety hose allowing space for passing of the working hose, the bushing including a space communicating with the space between the working hose and the safety hose, and the space in the bushing communicating with a pressure transmitter being able to signal an increase in pressure in the space between the working hose and the safety hose, characterized in that the bushing for connection to the two hoses includes two concentric threaded sleeves adapted to end couplings of the working hose and safety hose, respectively, and in that at one of the hoses ends, axially inside of the threaded part of the outer threaded sleeve an opening is arranged for the connection to a pressure transmitter. By the term "pressure transmitter" is meant any device capable of sensing a rise of pressure in the space between the working hose and the safety hose, and able to generate a signal indicating such a rise, which signal can then be observed by operating and/or maintenance personnel. This may include known pressure gauges, sensors delivering an electric signal to some warning and/or control device as well as simple optical transmitters which through an on/off-signal will give a warning that the safety hose is under increased pressure.

Through this solution several decisive advantages are achieved:

the hose system may be constructed using available components or components that are easy to manufacture a high level of safety against leakage of hydraulic fluid is achieved using simple means, the ability to make repairs before a leakage will occur is obtained during repairs the replacement of parts is limited to the leaking hoses repairs are therefore easy to make and can be done using standard replacement parts the extra space required, compared to similar known systems, will be insignificant.

BRIEF DESCRIPTION OF THE DRAWINGS

Further details in connection with the invention will be apparent from the description given below, of an example of the invention.

The invention is described in more detail below with reference to the drawings, where FIG. 1 is a side view showing a transparent image of an end fitting included in one embodiment of the invention, FIG. 2 is a exploded view showing the parts included in the end fitting of FIG. 1, and FIG. 3. is a side view of a joint for use in one embodiment of the invention.

DESCRIPTION OF THE PREFERRED EMBODIMENTS

FIGS. 1 and 2 shows an end fitting for a hose system according to the invention. The hose system comprises, in this example, a working hose 11 arranged in a safety hose 12 having a diameter sufficiently large to be able to receive the working hose 11, including parts that will be disclosed below. The working hose 11 and the safety hose 12 are connected by means of a bushing 13 adapted for coupling to a supply or reception unit 14 for hydraulic fluid, through the use of an opening 15.

The working hose 11 includes an hydraulic hose 16 connected to an end coupling 17 in a manner well known in the art. Similarly, the safety hose 12 includes an hydraulic hose 18 connected to an end coupling 19. It is necessary for the end coupling 19 of the safety hose 12 to have an internal diameter that allows for the passage of the end coupling 17 of the working hose 11.

The bushing 13 includes at one of its ends a threaded sleeve 20 for connection to the opening 15 and at the other end two concentric, threaded sleeves, an inner threaded sleeve 21 for connection to the end coupling 17 of the working hose 11, and an outer threaded sleeve 22 for connection to the end coupling 19 of the safety hose 12.

The bushing 13 includes a suitable element for a wrench, in this example a hex-nut 23 of a known type.

A closed annulus 24 communicating with the space 25 between the working hose 11 and the safety hose 12 is formed between the concentric threaded sleeves 21 and 22. The annulus 24 in the bushing includes a bore 26 extending radially to a collar nipple 27 which in turn, is connected through tubing 28, to a pressure gauge 29. The collar nipple 27 is arranged in a neck portion 35 of the bushing 13.

Initially, during assembly, the working hose 11 is tightly connected to the bushing 13. After the safety hose 12 has been pulled over the working hose, the other end of the working hose 11 may be connected to the supply or reception unit in a similar manner. This includes any working unit that needs to be supplied with hydraulic fluid under pressure for operation or control. The two ends of the safety hose 12 may then be tightly connected to the bushings 13.

In the event of failure this procedure will be reversed. This means that a leaking working hose 11 can be pulled out of the safety hose 12 and replaced with a new working hose, or a repaired one, without having to replace other parts.

If under operation of the working hose 11 the leakage occurs, leaked hydraulic fluid will be caught in the safety hose 12, which will need to be designed to be able to withstand the working pressure, at least during a time period sufficiently long to allow for the disconnection of the hose system. The pressure gauge 29 will allow monitoring or operational personnel to observe the presence of a leak and start planning and performing shutdown and repairs. This can be done in a way that will reduce the losses during shutdown. In reality, the invention allows for the possibility of extending the time of operation, so that repairs can be made in connection with ordinary maintenance or some planned shutdown.

FIG. 3 illustrates a bushing 30 that may be used for the creation of joints in connection with the hose system according to the invention. The bushing 30 includes ends similar to the hose-connecting parts of the bushing 13 for joining the ends of the working hose 11 and safety hose 12. A collar nipple 32, in a neck part 34, is arranged on one side of the nut 31 for the provision of a pressure gauge, and the two annular spaces are connected to an axially extending channel 33 for the transfer of leaked hydraulic fluids.

The invention may be modified in different ways, especially with regard to the arrangement of the leakage warning. Instead of a pressure gauge that reacts on the hydraulic fluid that might have leaked from the working hose 11, a sensor or a pressure transmitter outputting an electric signal that may be suitably communicated to some reception point for manual or automatic monitoring may be arranged in the bore 26. Automatic monitoring may involve some form of signalling in addition to the control of an operational system that is able to stop the supply of hydraulic fluid to the working hose 11.

In an alternative embodiment a simple transmitter may be installed in the bore 26, providing a visual signal indicating the presence of a leak having pressurized the safety hose. In many cases, e.g. in connection with construction engines, such a transmitter which is checked during routine checks and maintenance may suffice.

The invention may also be applied in combination with a monitoring of the amount of hydraulic fluid present in the system which will be able to detect a complete hose failure and loss of hydraulic fluid.

Repairs of a hose system according to the invention, in the event of a leak, will be made as follows:

The safety hose is disconnected at both ends.

Leaked fluids are drained from the safety hose.

The working hose is disconnected at both ends.

The damaged working hose 11 is pulled out of the safety hose.

A replacement working hose is pulled through the safety hose.

The new working hose is connected through its end couplings.

The safety hose is connected through its end couplings.

This replacement may be made during an ordinary shutdown of the hydraulic system. In this way repairs of the hose system, and thus the hydraulic system, in the event of some working hose leakage, may be performed during ordinary maintenance work, without resorting to an extraordinary shut-down.

To be able to disconnect the working hose, the safety hose already having been disconnected, it may be necessary to make the working hose a few centimeters longer than the safety hose.

In an alternative embodiment the axially extending channel in the bushing 30 is omitted for the benefit of a pressure sensor at both ends. In this way two parts of a larger system may be monitored separately.

The invention claimed is:

1. Hose system for use in a hydraulic operation and/or control system, namely in high-pressure hydraulic systems present in environments that are highly sensitive with respect to spillage of hydraulic fluids in the event of a leak, comprising a working hose (11) for the transfer of hydraulic fluid having a pressure substantially higher than atmospheric pressure, wherein the working hose includes a hydraulic hose connected to an end coupling, and a safety hose (12) surrounding the working hose (11), wherein the safety hose includes a hydraulic hose connected to an end coupling the working hose (11) and the safety hose (12) being tightly joined at least at the ends of the two hoses, and including a pressure transmitter (29) for indicating a rise in pressure in the space (25) between the two hoses, and further comprising at least one bushing (13) adapted for releasable connection to the working hose (11) and the safety hose (12), the cross-section of the safety hose (12) allowing space for passing of the working hose (11), the bushing (13) including a space (24) communicating with the space (25) between the working hose (11) and the safety hose (12), and the space (24) in the bushing (13) communicating with a pressure transmitter (29) being able to signal an increase in pressure in the space (25) between the working hose (11) and the safety hose (12), wherein the bushing (13) for connection to the two hoses (11, 12) includes two concentric threaded sleeves (21, 22) adapted to connect the end couplings of the working hose (11) and safety hose (12), respectively, and in that at one of the hoses ends, axially inside of the threaded part of the outer threaded sleeve (22), an opening is arranged for the connection to a pressure transmitter (29).

2. Hose system according to claim 1, wherein the bushing (13) for the connection of the two hoses (11, 12) includes a neck adjacent the area of the two concentric threaded sleeves (21, 22) having a connection for the pressure transmitter (29).

3. Hose system according to claim 1, wherein the pressure transmitter (29) includes a pressure sensor outputting an electric signal.

4. Hose system according to claim 1, wherein the pressure transmitter (29) includes an optical transmitter arranged to be able to indicate an increase in pressure in the safety hose by a signal of the on-off type.

* * * * *